Dec. 22, 1970  N. M. LANEY  3,549,196
VEHICULAR TOWED CAMPING TRAILER
Filed March 7, 1969  2 Sheets-Sheet 1
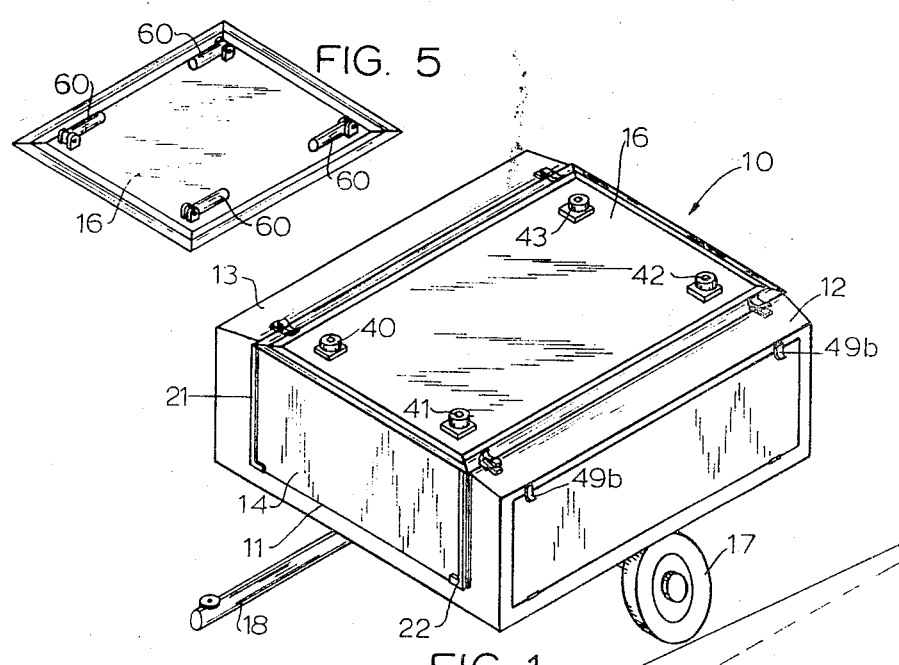
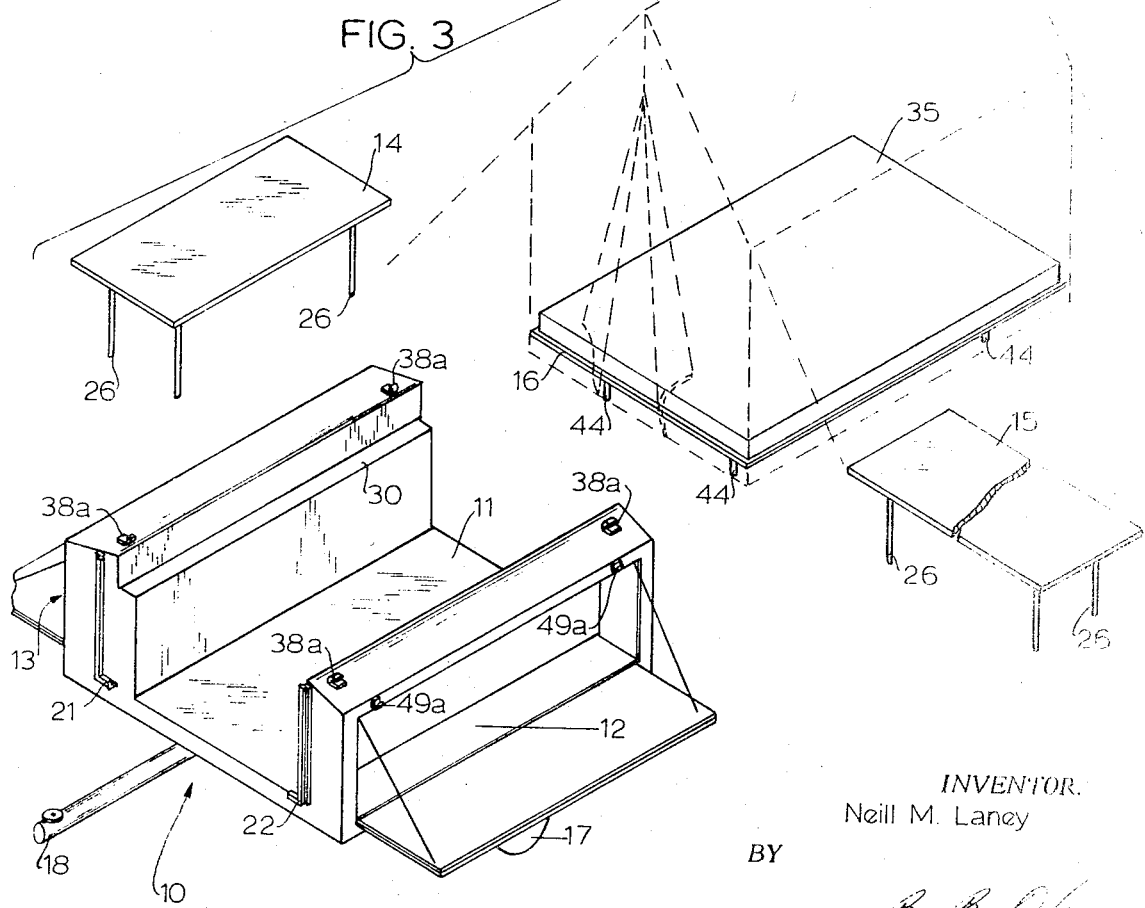
INVENTOR.
Neill M. Laney
BY
B. B. Olive
ATTORNEY

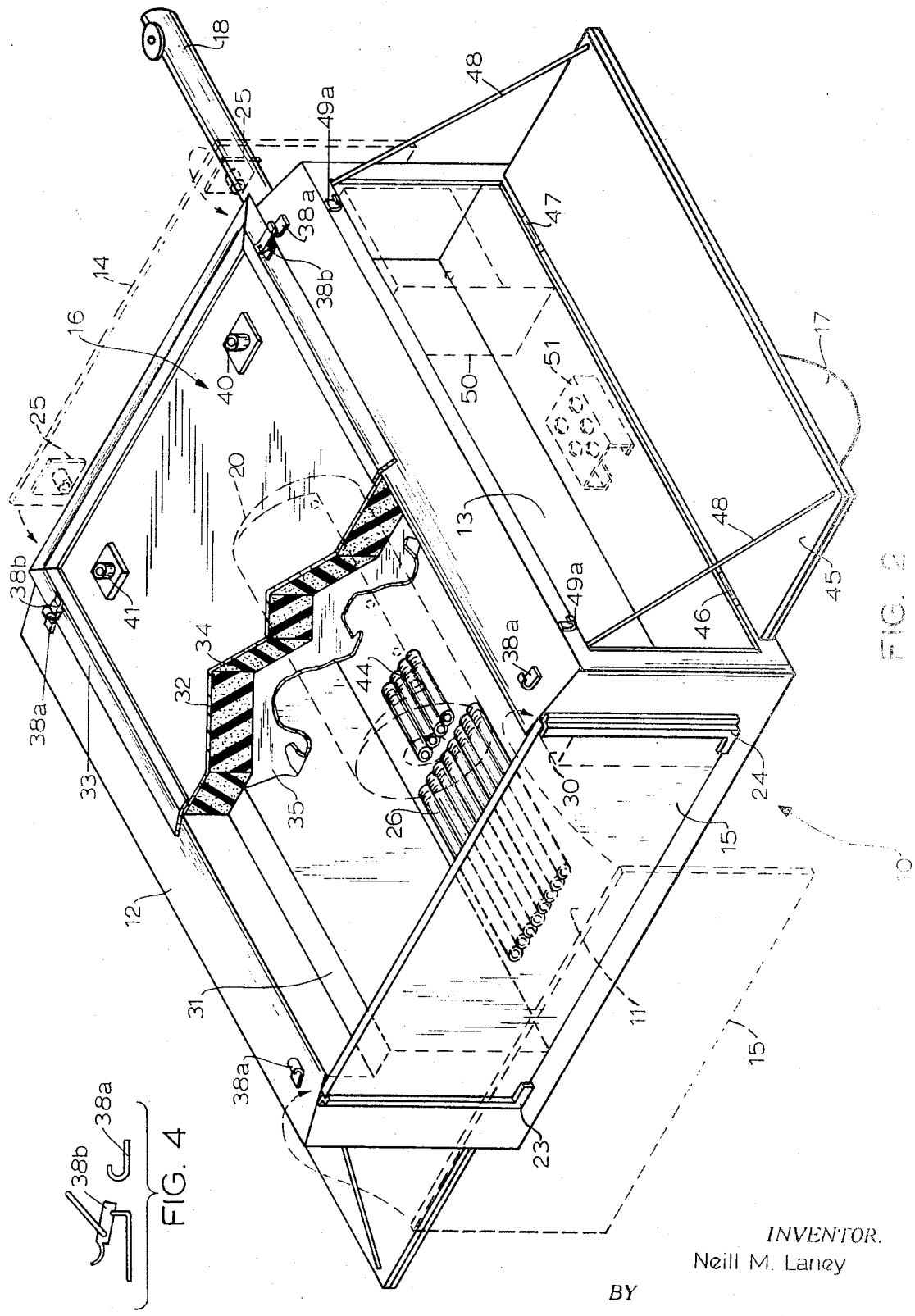

United States Patent Office 3,549,196
Patented Dec. 22, 1970

3,549,196
VEHICULAR TOWED CAMPING TRAILER
Neill M. Laney, 2430 Medway Drive,
Raleigh, N.C. 27608
Filed Mar. 7, 1969, Ser. No. 805,165
Int. Cl. B60p 3/32
U.S. Cl. 296—23        7 Claims

ABSTRACT OF THE DISCLOSURE

A vehicular towed camping trailer provides a covered compartment for hauling camping gear and employs removable end gates which can be converted into tables and a removable cushioned top which can be converted into a cushioned bed.

BACKGROUND OF THE INVENTION

(1) Field of the invention

This invention relates broadly to vehicular towed trailers and particularly to vehicular towed camping trailers.

(2) Description of the prior art

Various types of camping trailers have been devised which are towed behind vehicles and which, upon reaching the camping site, can be converted to various uses. Many trailers act simply as a storage and carrying means for camping gear; however, in recent years many camping trailers have been made which serve as a sleeping area and have completely eliminated the use of tents. This type of sleeping camping trailer places many restrictions upon the camper since he must place his camp site in an area suitable for trailer parking. (See Pats. 1,579,815; 2,719,054, and 2,853,338.) Quite often, it is desired to camp alongside streams or in heavily wooded areas which are not immediately accessible thereto by cars or trucks. Camping in these areas can be achieved only by the use of tents.

Also, there is a tremendous jump in cost when the camper moves from tent camping to sleeping trailer camping. Tent campers must pack their equipment in the car, trunk, or station wagon for transportation to the camp site. Many campers who have already invested in tents would greatly welcome a type of camping trailer which could be used in conjunction with their tent.

SUMMARY OF THE INVENTION

A vehicular towed camping trailer according to a preferred embodiment of the invention comprises a trailer having a central storage compartment, side storage compartments, removable end gates which can be assembled for use as tables and a removable top panel which serves as a covering for the central compartment while transporting the camping gear and which can be removed, inverted and assembled for use as a bed for use within the camping tent. Both end gates and the top panel are formed as rigid panels of metal, plywood or the like and have fasteners secured thereto which mount support legs. The end gates and top panel once removed from the trailer at the camping site can be quickly converted to the respective table and bed uses. It is therefore an object of the invention to provide a vehicular towed camping trailer which offers a storage area for the tent camper's gear in transit and whose parts can be converted into other practical camp uses upon reaching the camp site.

Another object of the invention is to provide a vehicular towed camping trailer for the camper who already owns and wants to continue the use of a tent, who does not wish to invest in the more expensive type sleeping camping trailers and yet who desires and needs a hauling trailer and particularly so when it will add to the comfort of camping and be less expensive than a sleeping camping trailer.

Other objects will appear from the drawings and description to follow.

DESCRIPTION OF THE DRAWINGS

FIG. 1 is a perspective view of a vehicular towed camping trailer according to the invention.

FIG. 2 is an enlarged perspective view of the camping trailer with the removable top panel broken away to reveal the interior storage compartment, with the side storage compartments open and the end gates illustrated in dashed lines for illustration purposes.

FIG. 3 is an exploded perspective view with the top panel removed and serving as a bed unit in a camping tent, the end gates removed and assembled for use as tables and also showing the central and side storage compartments.

FIG. 4 is a side elevation view of a conventional type fastener employed for hold down of the top panel and for closing the side storage compartments.

FIG. 5 is a perspective view of an alternate folding leg construction.

DESCRIPTION OF THE INVENTION

Referring to FIG. 1, the camping trailer 10 is comprised of a bed or bottom wall portion 11, upright side wall and storage compartments 12, 13, a pair of removable end gates or wall 14, 15, a removable top panel or wall 16, wheels 17 and trailer tongue 18 whereby trailer 10 is towably secured to a vehicle.

Referring now to FIG. 2 the body of camping trailer 10 is generally U-shaped and the base of the trailer acts as a storage bed 11 for receiving the camping gear, e.g. tent 20 which may be placed so as to reside during hauling within the central compartment formed by side compartments 12, 13 and end gates 14, 15.

Front channel guides 21, 22 and corresponding rear channel guides 23, 24 are secured to the ends of side storage compartments 12, 13 and serve as guides for removable end gates 14, 15. End gates 14, 15 mount threaded leg receiving fasteners 25 (see FIG. 2), which are adapted to removably receive threaded leg members 26 so as to form tables (FIG. 3) once the end gates 14, 15 are removed at the camp site. Leg members 26 can be stored during transit as in FIG. 2.

Side storage compartments 12, 13 form side walls for the trailer and have recessed areas 30, 31 which receive the top panel 16. The top panel 16 has a rigid reinforcing plate 32 and a flange member 33 which extends completely around top panel 16 and is made integral with plate 32. When top panel 16 resides on trailer 10 flange 33 rests on top of side wall storage compartments 12, 13 and is preferably provided with a watertight gasket, not shown, that is secured to the underside of flange 33 and prevents water seepage into the central storage compartment. The tops of side storage compartments 12, 13 are preferably slightly tapered so that any water tends to flow off. While the construction thus far described should be relatively light a wide choice of materials are available, e.g. plate metal, plywood and glass fiber materials.

A thick cushion member 34, of foam rubber or the like having a covering 35 is secured to the side of plate 32 that is the underside during transit. At the camp site cushion 34 and covering 35 forms a mattress which will be referred to later in the description. Top panel 16 is held in place on camping trailer 10 by mating fasteners 38a, 38b, 38a being rigidly secured to the top of side storage compartment 12, 13 and fasteners 38b being rigidly secured to flange 33 at a position which mates with fasteners 38a.

FIG. 4 more clearly illustrates this type of fastener. Top panel 16 also mounts four threaded leg receiving fasteners 40, 41, 42, 43 which are secured to top panel 16 on the side opposite cushion 34. Leg fasteners 40, 41, 42, 43 receive threaded leg members 44 (FIGS. 2 and 3) once top panel 16 has been removed from trailer 10 and is positioned for use as a bed.

While not deemed part of the invention, it will be noted that side storage compartment 13 has a door 45 which is hinged by hinges 46, 47 and is supported once opened by means of rope members 48. When closed, door 45 is held by fasteners 49a, 49b that are secured respectively to the top side of storage compartment 12 and door 45. Fasteners 49a and 49b are identical in construction to those used to hold top panel 16 in place and are best illustrated in FIG. 4. Side compartment 12 is identical in construction to that of compartment 13. Side compartments 12, 13 may of course serve various uses both in transit and during camping. FIG. 2 illustrates, for example, a camp refrigerator 50 and a bottle receiving member 51. Side compartments 12, 13 may serve various uses other than for food storage, e.g. cooking utensils might be stored in these compartments and while not per se a part of the invention such compartments contribute to the overall enjoyment of the inventive features of the trailer.

In preparation for a camping trip, top panel 16 is removed and end gates 14, 15 are installed on the camping trailer 10. Any camping gear, e.g. tent 20, legs 26 and legs 24, which cannot be stored in side compartments 12, 13 may be placed within the main central compartment formed by side compartments 12, 13, end gates 14, 15 and bed 11. Once this main central compartment has been filled, top panel 16 is positioned so that flange 33 resides on top of side compartments 12, 13 and overlaps end gates 14, 15. Fasteners 38a and 38b are then made secure. The trailer tongue 18 is then ready to be secured to a conventional vehicle trailer hitch for towing to the desired camp site.

Once trailer 10 has arrived in the camping area and the desired camp site has been picked out, top panel 16 may be released by releasing fasteners 38a and 38b and the threaded leg members 44 may be quickly screwed into threaded leg receiving fasteners 40, 41, 42, and 43. Top panel 16 may then be inverted to expose the cushion 34 and cover 35. At this stage tent 20 may be assembled so that the rigid top panel 16 resides within the interior of the tent and provides above ground support for the cushion member 34 and cover member 35 which are ready to serve as a mattress.

While not shown it may be observed that end gates 14, 15 could, if desired, be provided with cushions for sleeping children and the bed member 11 could likewise be made removable and cushioned.

In addition to providing an above ground supported bed mattress by utilizing the rigid, top panel 16, the trailer of the invention also provides substantial table space. In this regard it will be noted as best shown in FIG. 3 that once end gates 14, 15 are removed, threaded legs 26 may be quickly secured to the respective threaded fasteners 25 on the end gates 14, 15 to form the pair of tables shown in FIG. 3.

While detachable legs are preferred it is evident that either panel 16, gate 15 or gate 16 could be provided with permanently attached folding legs. This is illustrated in FIG. 5 where folding legs 60 are shown secured to panel 16. Further, while it is preferred that the end walls or gates 15, 16 be loosely retained during transit in the illustrated guides and held by the top wall edges, gates 15, 16 could also of course be retained in transit by quick release fasteners or similar means.

What is claimed is:
1. In a vehicular towed camping trailer:
   (a) a rectangular trailer body having side, bottom, end and top walls forming a covered storage compartment during transit, said end and top walls being formed as rigid panels and said top wall having edge portions adapted during transit to rest in a sealing relation on said side and end walls;
   (b) quick, releasable fastener means enabling selected outer surface edge portions of said top wall to be temporarily secured during transit to other selected walls, said top wall being otherwise unsecured thus allowing immediate, and complete removal of said top wall from said body at the camp site; and
   (c) a set of four leg members and leg member securing means on said outer surface of said top wall thereby enabling said top wall when inverted from its transit position to serve as a bed support at a camp site remote from the parking site of the trailer.

2. The trailer of claim 1 wherein said leg members are detachably secured to the four corners of said top wall so as to be quickly removable therefrom and storable in said compartment during transit.

3. The trailer of claim 1 wherein said leg members are foldably secured to said top wall outer surface and remain thereon during transit.

4. The trailer of claim 1 including means loosely mounting each said end wall during transit and enabling each said end wall to be completely removed from said body at the camp site and including leg members adapted to be secured to and support each said end wall for service as a table at the camp site.

5. The trailer of claim 1 including guide means secured to said side walls and loosely and slidably mounting said end walls, said top wall edge portions being effective to retain said end walls in said guide means during transit and said end walls upon removal of said top wall also being completely removable from said body, and a separate set of leg members for securing to one side and to the four corners of each said end wall thereby enabling each said end wall to serve as a table at the said camp site.

6. The trailer of claim 1 wherein said top wall carries during transit on the inner surface thereof a cushion secured thereto and adapted for service as a mattress when said top wall is inverted at the camp site.

7. The trailer of claim 5 wherein said top wall carries during transit on the inner surface thereof a cushion secured thereto and adapted for service as a mattress when said top wall is inverted at the camp site.

References Cited

UNITED STATES PATENTS

| | | | |
|---|---|---|---|
| 2,853,338 | 9/1958 | Stanley | 296—23 |
| 3,406,935 | 10/1968 | Mutchnik | 248—188 |

PHILIP GOODMAN, Primary Examiner

U.S. Cl. X.R.

248—188; 5—3